(12) United States Patent
Avalos (10) Patent No.: US 6,623,797 B2
(45) Date of Patent: Sep. 23, 2003

(54) METHOD FOR COATING METAL STRIP

(75) Inventor: James T. Avalos, Livermore, CA (US)

(73) Assignee: Alcoa Inc., Pittsburgh, PA (US)

( * ) Notice: Subject to any disclaimer, the term of this patent is extended or adjusted under 35 U.S.C. 154(b) by 55 days.

(21) Appl. No.: 09/927,624

(22) Filed: Aug. 13, 2001

(65) Prior Publication Data

US 2002/0050325 A1 May 2, 2002

Related U.S. Application Data

(62) Division of application No. 09/082,608, filed on May 20, 1998, now abandoned.
(60) Provisional application No. 60/048,354, filed on May 30, 1997, and provisional application No. 60/056,084, filed on Aug. 27, 1997.

(51) Int. Cl.$^7$ .............................. B05D 7/14; B05D 3/02
(52) U.S. Cl. .................... 427/209; 427/318; 427/388.1; 427/388.2; 427/398.1; 427/374.4; 427/348; 427/365
(58) Field of Search ....................... 156/244.11, 244.24; 427/209, 318, 388.2, 388.1, 398.1, 324.4, 348, 365

(56) References Cited

U.S. PATENT DOCUMENTS

| 2,175,125 A | 10/1939 | Mack et al. ................... 91/68 |
| 2,967,786 A | 1/1961 | Wilson ......................... 117/49 |
| 3,206,848 A | 9/1965 | Rentmeester ................ 29/528 |

(List continued on next page.)

FOREIGN PATENT DOCUMENTS

| AU | 21011 | 12/1971 |
| AU | 419658 | 12/1971 |
| BE | 622883 | 9/1962 |
| CH | 584 382 | 1/1977 |

(List continued on next page.)

OTHER PUBLICATIONS

Quantum, A Guide to Polyolefin Extrusion Coating, Quantum Chemical Corporation, Cincinnati, Ohio, Copyright 1992.
Menges, Georg, Materials Technology. Synthetic Materials (Plastics). Thrid Completely Revised and Expanded Edition.
Bigg, Donald, "Producing Thermoplastic Matrix Sheet Composites: Two Processes", Plastics Engineering, Oct. '90.
Michaeli, W., "Plastics Processing II, Extruder Technology", Institute for Plastics Processing at the RWTH AACHEN.
Bongaerts, H., "Flat Film Extrusion Using Chill–Roll Casting", Plastics Extrusion Technology, Hanser Publishers, Munich Vienna New York, pp. 143–341.
Bulletin of Patent Public Disclosure, Kokai Tokkyo Koho, Patent Application Public Disclosure, Kokai Tokkyo Koho, Patent Application Public Disclosure No. (Tokkyo Shutsugan Kokai Bangho) Tokkai Sho 60–250936:1985–250936.
Thakrar, Anil and Arthur C. Hettinger, "Development of a Dual Extrusion Die", Soc Plast Eng, Tech Pap, vol. 21, pp. 366–369 (1975).

Primary Examiner—Jeff H. Aftergut
Assistant Examiner—Barbara J Musser
(74) Attorney, Agent, or Firm—Christian E. Schuster; Edward L. Levine (57) ABSTRACT

In a preferred embodiment, the present invention is an apparatus and a method for coating both surfaces of a continuous processing aluminum strip by extruding thin polymeric film onto the aluminum strip. Generally, the aluminum strip is uncoiled, passed through a preheating unit, two extrusion heads, a post-heater, an air quench, a lubricator, and then it is recoiled.

36 Claims, 3 Drawing Sheets

U.S. PATENT DOCUMENTS

| | | | |
|---|---|---|---|
| 3,294,613 A | 12/1966 | Eichler | 156/242 |
| 3,547,682 A | 12/1970 | Erb | 117/75 |
| 3,575,762 A | 4/1971 | Goehring et al. | 156/244 |
| 3,679,513 A * | 7/1972 | Addinall et al. | 156/308.8 |
| 3,783,072 A | 1/1974 | Korpman | 156/244.23 |
| 3,832,962 A | 9/1974 | Rolles | 113/120 |
| 3,962,060 A | 6/1976 | Brasko et al. | 204/181 |
| 4,064,302 A | 12/1977 | Kozlowski et al. | 428/152 |
| 4,486,497 A | 12/1984 | Mizutani | 428/332 |
| 4,517,255 A | 5/1985 | Kanda et al. | 428/626 |
| 4,614,691 A | 9/1986 | Inui et al. | 428/623 |
| 4,788,088 A | 11/1988 | Kohl | 428/34.5 |
| 4,957,820 A | 9/1990 | Heyes et al. | 428/623 |
| 5,059,460 A | 10/1991 | Heyes et al. | 428/35.3 |
| 5,093,208 A | 3/1992 | Heyes et al. | 428/623 |
| 5,149,389 A | 9/1992 | Heyes et al. | 156/272.4 |
| 5,197,536 A | 3/1993 | Hanneman | 164/476 |
| 5,356,495 A | 10/1994 | Wyatt-Mair et al. | 148/551 |
| 5,401,575 A | 3/1995 | Anglin et al. | 428/341 |
| 5,407,702 A | 4/1995 | Smith et al. | 427/211 |
| 5,470,405 A | 11/1995 | Wyatt-Mair et al. | 148/551 |
| 5,496,423 A | 3/1996 | Wyatt-Mair et al. | 148/551 |
| 5,514,228 A | 5/1996 | Wyatt-Mair et al. | 148/551 |
| 5,515,908 A | 5/1996 | Harrington | 164/481 |
| 5,564,491 A | 10/1996 | Harrington | 164/481 |
| 5,582,319 A | 12/1996 | Heyes et al. | 220/454 |
| 5,639,514 A * | 6/1997 | Jones et al. | 427/318 |
| 5,820,954 A * | 10/1998 | Ooyagi et al. | 428/35.7 |

FOREIGN PATENT DOCUMENTS

| | | | |
|---|---|---|---|
| DE | 1 446 737 | 4/1959 | |
| DE | 1 504 109 | 2/1969 | |
| DE | 1 621 848 | 6/1971 | |
| EP | 0 011 883 | 5/1980 | |
| EP | 011883 | 6/1980 | |
| EP | 0 067 060 | 3/1986 | |
| EP | 067060 | 5/1986 | |
| EP | 312304 | 4/1989 | |
| EP | 0 312 309 | 1/1992 | |
| EP | 0 312 302 | 6/1992 | |
| EP | 0 312 304 | 3/1993 | |
| EP | 0763419 | 8/1996 | B32B/15/08 |
| EP | 0 820 353 | 12/2001 | |
| FR | 622883 | 9/1962 | |
| GB | 819105 | 8/1959 | |
| GB | 852619 | 10/1960 | |
| GB | 2 027 391 | 2/1980 | |
| GB | 2211465 | 5/1989 | |
| GB | 2233277 | 9/1991 | |
| GB | 2211140 | 4/1992 | |
| JP | 55144098 | 11/1980 | |
| JP | 5825591 | 5/1983 | |
| JP | 59202847 | 11/1984 | B32B/15/08 |
| JP | 250936 | 11/1985 | |
| JP | 61127331 | 6/1986 | B29C/63/02 |
| JP | 2047050 | 2/1990 | B32B/15/08 |
| JP | 1189206 | 3/1991 | B32B/15/08 |
| JP | 3053933 | 3/1991 | |
| JP | 5-42650 | 2/1993 | |
| JP | 6071777 | 3/1994 | B29C/47/02 |
| JP | 06-079801 | 3/1994 | |
| JP | 6106640 | 4/1994 | B29C/47/14 |
| JP | 6305024 | 11/1994 | B29C/47/02 |
| JP | 8001862 | 1/1996 | B29C/47/02 |
| JP | 8230130 | 9/1996 | B32B/1/02 |
| WO | 9401224 | 1/1994 | |
| WO | 9632202 | 10/1996 | |

* cited by examiner

FIG. 3

METHOD FOR COATING METAL STRIP

This application is a divisional of U.S. continuation-in-part patent application Ser. No. 09/082,608, filed May 20, 1998, now abandoned which claims the benefit of U.S. provisional patent application serial Nos. 60/048,354 and 60/056,084, filed May 30, 1997 and Aug. 27, 1997, respectively, which are hereby incorporated by reference in their entireties.

FIELD OF THE INVENTION

The present invention is a method for coating both sides of an aluminum strip by extruding a thin polymeric film onto the strip.

BACKGROUND OF THE INVENTION

Currently, thermosetting protective and decorative coatings are generally applied to metal strip or strip for packaging end uses by roller-coating of a solvent-based film. After application of the film to the metal sheet or strip, the solvent is typically removed by evaporation and the applied coating is cured. The coating can be applied by a variety of processes such as roll coating, reverse roll coating, spraying, electrocoating, powder coating, and lamination. The coated strip may be used in such applications as cans and can ends, foil pouches, lidding stock, appliances, electrical devices, construction, aerospace or automotive body strip.

The present invention is a new apparatus and process for coating can stock, lid stock, tab stock and food container stock.

SUMMARY OF THE INVENTION

The present invention is a device for extruding a resin coating onto a moving aluminum strip, comprising: a first extrusion coating head for coating one side of the strip, the coating head being capable of applying a thermosettable or thermoplastic resin, the coating head comprising a resin reservoir, an extruder barrel, where the resin is heated to a low temperature melt point of between 310° F. and 380° F., a slotted die, and a means for extruding the melted resin through the slotted die under pressure; the slotted die is positioned vertically above the strip, which is moving on the support roller, so that the extruded resin is applied to the surface of the strip and compressed when it is moved through the compression roller; a second means for positioning the strip, comprising a support roller and a compression roller, so that the uncoated side of the strip is positioned to accept a resin coating; a second extrusion coating head for coating the uncoated side of the strip, the coating head being capable of applying a thermosettable or thermoplastic resin, the coating head comprising a resin reservoir, an extruder barrel where the resin is heated to a low temperature melt point of between 310° F. and 380° F., a slotted die, and a means for extruding the melted resin through the slotted die under pressure; the slotted die is positioned vertically above the strip, which is moving on the support roller, so that the extruded resin is applied to the surface of the strip and compressed when it is moved through the compression roller; and a resin cure means. The present invention also includes a process for extruding a resin coating onto a moving aluminum strip, comprising: creating a moving aluminum strip; melting a resin at a temperature between 310° F. and 380° F.; extruding a resin onto a least one side of the moving aluminum strip; curing the resin; and quenching the aluminum strip.

Among other things, the present invention is a simplified way to coat both sides of a moving aluminum strip. The resin melts and sets at a lower temperature, which allows the device and process to be smaller and simpler.

More specifically, the present invention is a device for extruding a resin coating onto a moving aluminum strip, comprising: an uncoiler; entry rollers; a means to heat the strip; a first means for positioning the strip, comprising a support roller and a compression roller; a first extrusion coating head for coating one side of the strip, the coating head being capable of applying a thermosettable or thermoplastic resin, the coating head comprising a resin reservoir, an extruder barrel, where the resin is heated to a low temperature melt point of between 300° F. and 380° F., a slotted die, and a means for extruding the melted resin through the slotted die under pressure; the slotted die is positioned vertically above the strip, which is moving on the support roller, so that the extruded resin is applied to the surface of the strip and compressed when it is moved through the compression roller; a second means for positioning the strip, comprising a support roller and a compression roller, so that the uncoated side of the strip is positioned to accept a resin coating; a second extrusion coating head for coating the uncoated side of the strip, the coating head being capable of applying a thermosettable or thermoplastic resin, the coating head comprising a resin reservoir, an extruder barrel where the resin is heated to a low temperature melt point of between 310° F. and 380° F., a slotted die, and a means for extruding the melted resin through the slotted die under pressure; the slotted die is positioned vertically above the strip, which is moving on the support roller, so that the extruded resin is applied to the surface of the strip and compressed when it is moved through the compression roller; a resin cure means; a third means to position the strip; a means to cool the strip, comprising an air quench; a fourth means for positioning the strip; a means to lubricate the coated strip; exit rollers; and a recoiler. The preferred device further comprises a preheat oven which heats the strip to between 365° F. and 400° F., and a curing oven which heats the strip to a temperature between 430° F. and 460° F. Preferably, the final thickness of the resin coating on the strip is between 0.00004 and 0.0004 inches, and the slot die thickness is between 0.014 and 0.018 inches. The preferred process includes extruding a resin coating onto a moving aluminum strip, comprising: uncoiling an aluminum strip; heating the strip to a temperature between 350° F. and 400° F.; coating one side of the strip with an extrudable resin that has been heated to a temperature between 325° F. and 370° F.; drawing the resin coating to between 0.00004 and 0.0005 inches; positioning the strip to receive a second resin coating; coating a second side of the strip with an extrudable resin that has been heated to a temperature between 325° F. and 370° F.; drawing the second resin coating to between 0.00004 and 0.0005 inches; curing the resin coatings on the strip by heating the strip to between 430° F. and 460° F.; quenching the strip to between 130° F. and 150° F.; lubricating the strip; and coiling the strip.

DETAILED DESCRIPTION

In a preferred embodiment, the present invention is an apparatus and a method for coating both sides of a continuous process aluminum strip by extruding thin polymeric film onto the aluminum strip. Preferably, the aluminum strip is uncoiled, passed through a preheating unit, two extrusion heads, a post-heater, a quench, a lubricator, and then it is recoiled.

The present invention is designed to coat an aluminum strip surface with a thin polymeric film. (The polymeric film may also be called a extrudate, resin, or extrusion coating.) The aluminum strip can be produced in a variety of different ways. For example, the strip may be produced according to the methods shown in any of the following United States patents, which are all incorporated by reference in their entireties: U.S. Pat. Nos. 5,470,405; 5,514,228; 5,515,908; 5,564,491; 5,496,423; and 5,356,495. These patents describe a process for producing an aluminum strip that is about 12 inches wide and is suitable for beverage can manufacture. The aluminum strip is typically coiled and stored in an uncoated state. However, the present invention contemplates obtaining strip from a stored coil or as an in-line process. Equipment for coiling is known in the art and it includes the following types: coil leveling lines, coil annealing lines, coil shearing lines, and coil lithostrip lines. Furthermore, standard coilers operate at speeds from 200 feet per minute to 4000 feet per minute. Additionally, the coilers can operate at temperatures of the aluminum strip between 200° F. and 600° F.

At some point before the strip surface is coated with the resin, it is precleaned or pretreated to provide a better surface for the resin to adhere. Cleaning methods are known to those of skill in the art and include caustic or acid washes. Pretreatments may include chromium, zirconium, or titanium conversion coatings.

Figure 1:
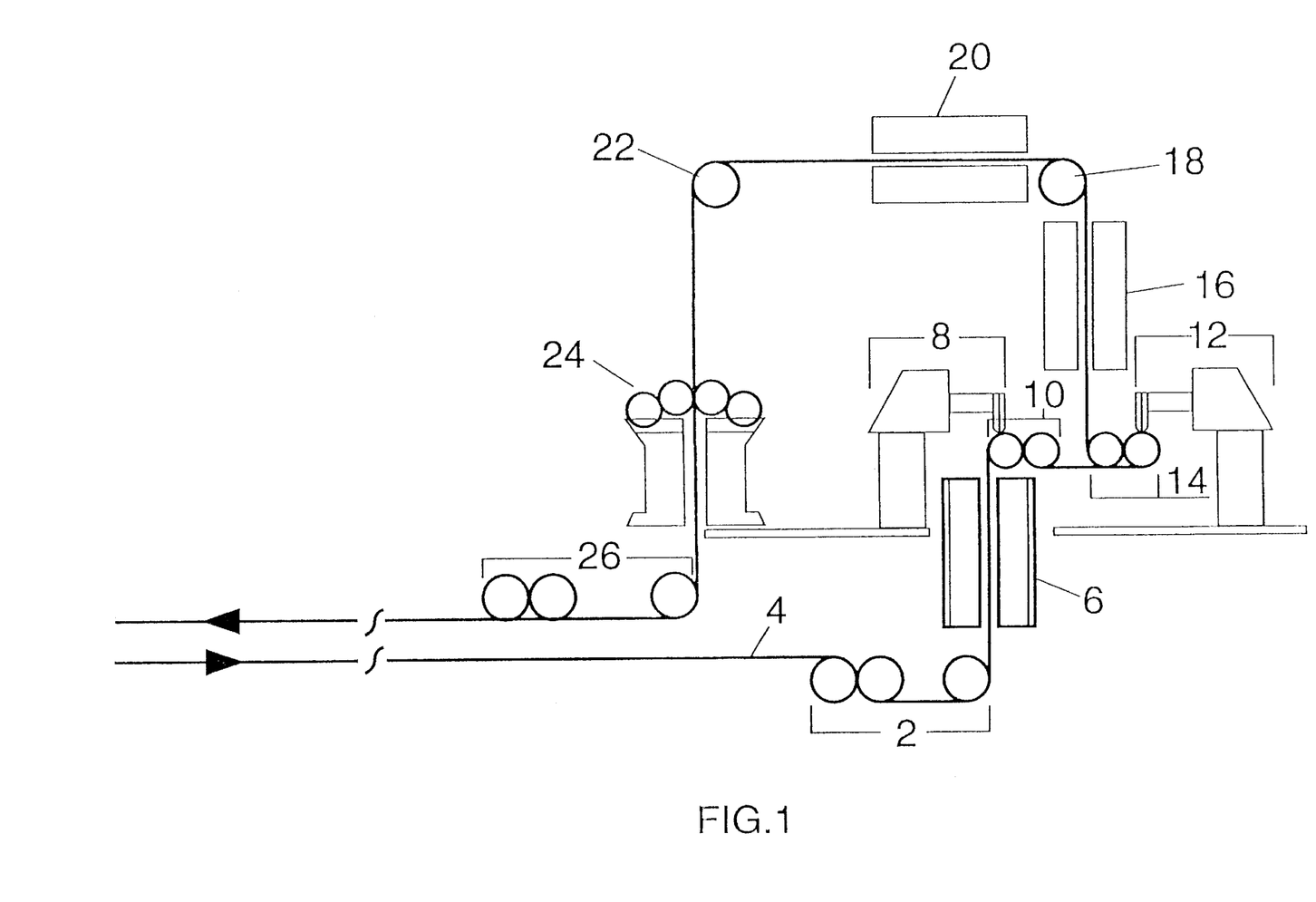
FIG. 1 is a schematic view of the device of the present invention.

A preferred embodiment of the present device is illustrated in FIG. 1 and it consists of entry rollers 2 to position the aluminum strip 4, a preheat oven 6, a first extrusion coating head 8 for the bottom surface (e.g., first surface) of the strip 4, rollers 10 to position the aluminum strip 4 relative to the first extrusion coating head 8, a second extrusion coating head 12 for the top surface (e.g., second surface) of the aluminum strip 4, a pair of rollers 14 designed to position the aluminum strip 4 relative to the second extrusion coating head, a final cure heater 16 and a roller 18 to position the aluminum strip 4 as it exits the heater and before it enters an air quench 20, a roller 22 to position the aluminum strip 4 as it leaves the air quench and enters a lubricator, two-roll coater 24, and exit rollers 26 designed to position the aluminum strip 4 relative to the lubricator and the coiler.

The aluminum strip 4 can be uncoiled by methods known in the art. During uncoiling, it is fed into the present process and apparatus for extrusion coating. The present extrusion coating device is operated in an in-line process as follows. Several rollers may be positioned before rolls 2 and after rolls 26 in the present device to ensure appropriate positioning of the moving aluminum strip 4. The first portion of the present device is a preheat portion 6, preferably an induction heater or an infrared heater. Other methods for heating a moving aluminum strip 4 are known in the art and they include the following: air-gas convection; infrared; plasma; and corona discharge heaters.

The preferred moving aluminum strip 4 is typically between 0.006 and 0.015 inches in thickness, more preferably between 0.008 and 0.012 inches in thickness. Preferably, the strip is at least 4 or 6 inches wide, more preferably, at least 8 or 10 inches wide. Preferably, the strip is no more than 36 or 24 inches wide, more preferably, no more than 20 or 12 inches wide. Consequently, a heater must be able to provide the appropriate heating capability to this type of material.

The moving aluminum strip 4 can be uncoiled at a rate of between 200 and 4000 feet per minute, most preferably between 800 and 1200 feet per minute.

The preheat oven 6 preferably heats the moving aluminum strip 4 to a temperature above 350° F., but not more than 400° F. More preferably, the oven 6 heats the moving aluminum strip 4 to above 365° F., but less than 390° F. Further, a typical temperature range to which the moving aluminum strip 4 is heated is in the range of about 250–500° F.

Figure 2:
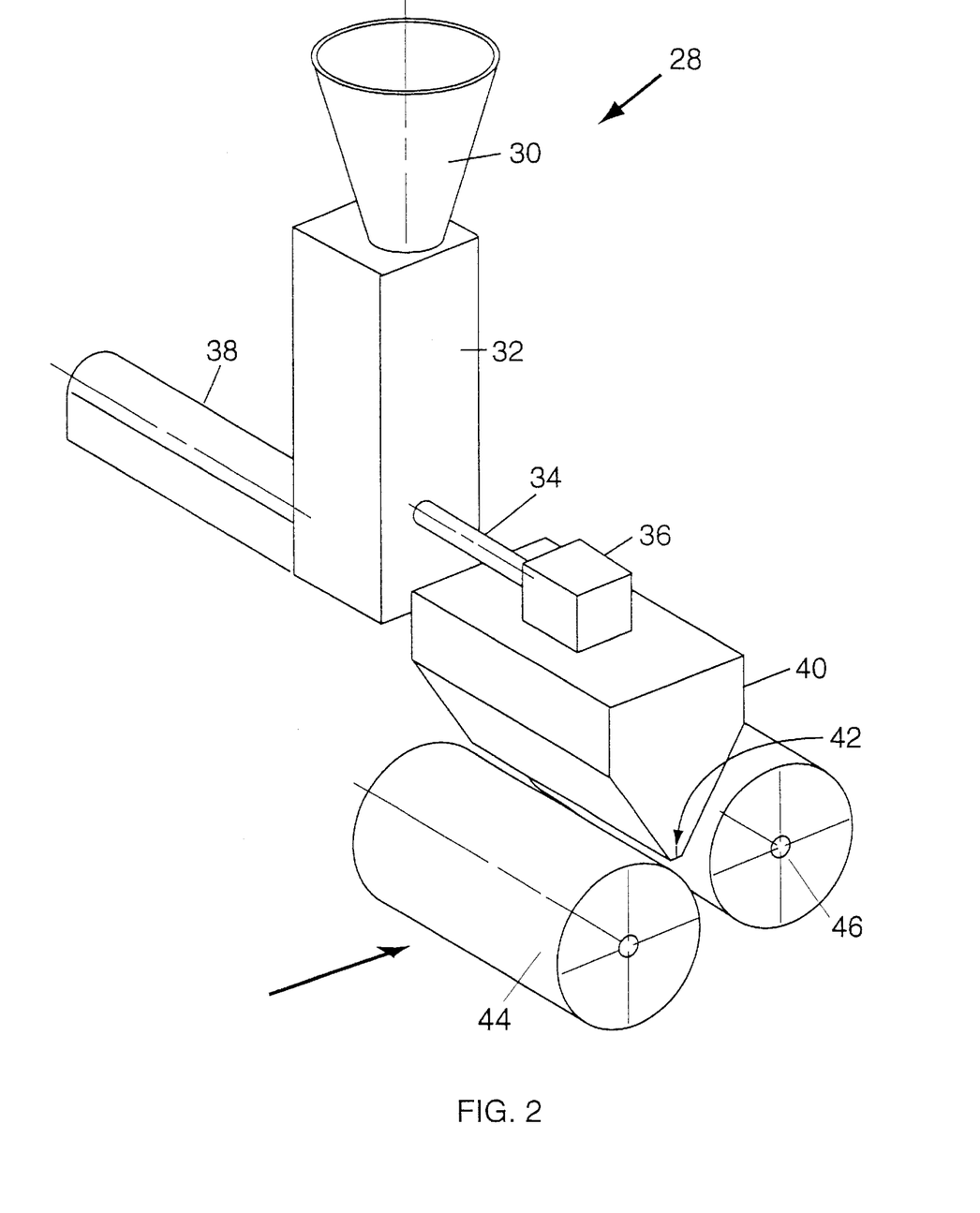
FIG. 2 shows the extruder head.

An extruder head 28 is shown in FIG. 2 and is comprised of a single screw, slot die extruder for extruding a thin polymeric film onto at least one surface of the aluminum strip. It contains a hopper or reservoir 30 for loading resin pellets, which leads to an extruder barrel 32 where the pellets are heated to a low temperature melt point of not more than: 380° F. or not less than 310° F., more preferably not more than 370° F., and not less than 325° F. Inside the extruder barrel, a rotating screw forces the melted resin through a transfer bar 34 and a feeding block 36. The rotating screw is driven by a motor and armature 38 and preferably generates 2000 lbs pressure to extrude the resin.

The primary purpose of the slot die 40 is to define a width and to provide an even cross sectional film thickness as well as smoothness of the extruded film. The preferred die design is based on the hinge effect, allowing smooth, precise adjustments on relative narrow center lines.

A slot die 40 is positioned in the feeding block so that the film exits in a form of a thin curtain. The slot die 40 preferably extends ¾ of an inch on each side of the slot die width, but not more than 1 inch. Preferably, the slot die aperture 42 is at least 0.012 inches wide, preferably, not more than 0.025 inches wide. More preferably, the slot die aperture 42 is at least 0.014 inches wide, preferably, not more than 0.020 inches wide. The preferred die is hinged to allow adjustments to be made in the width of the die opening. Preferably, the width can be adjusted every 1½ to 2½ inches along the length of the die, more preferably, every 2 inches.

The film thickness can be measured by a micrometer after it has been extruded and allowed to come to room temperature. Also, the film thickness can be measured as it is applied to the strip by using a device that measures the capacitance as compared to standards. Thereafter, the die may be adjusted to vary the film thickness.

Figure 3:
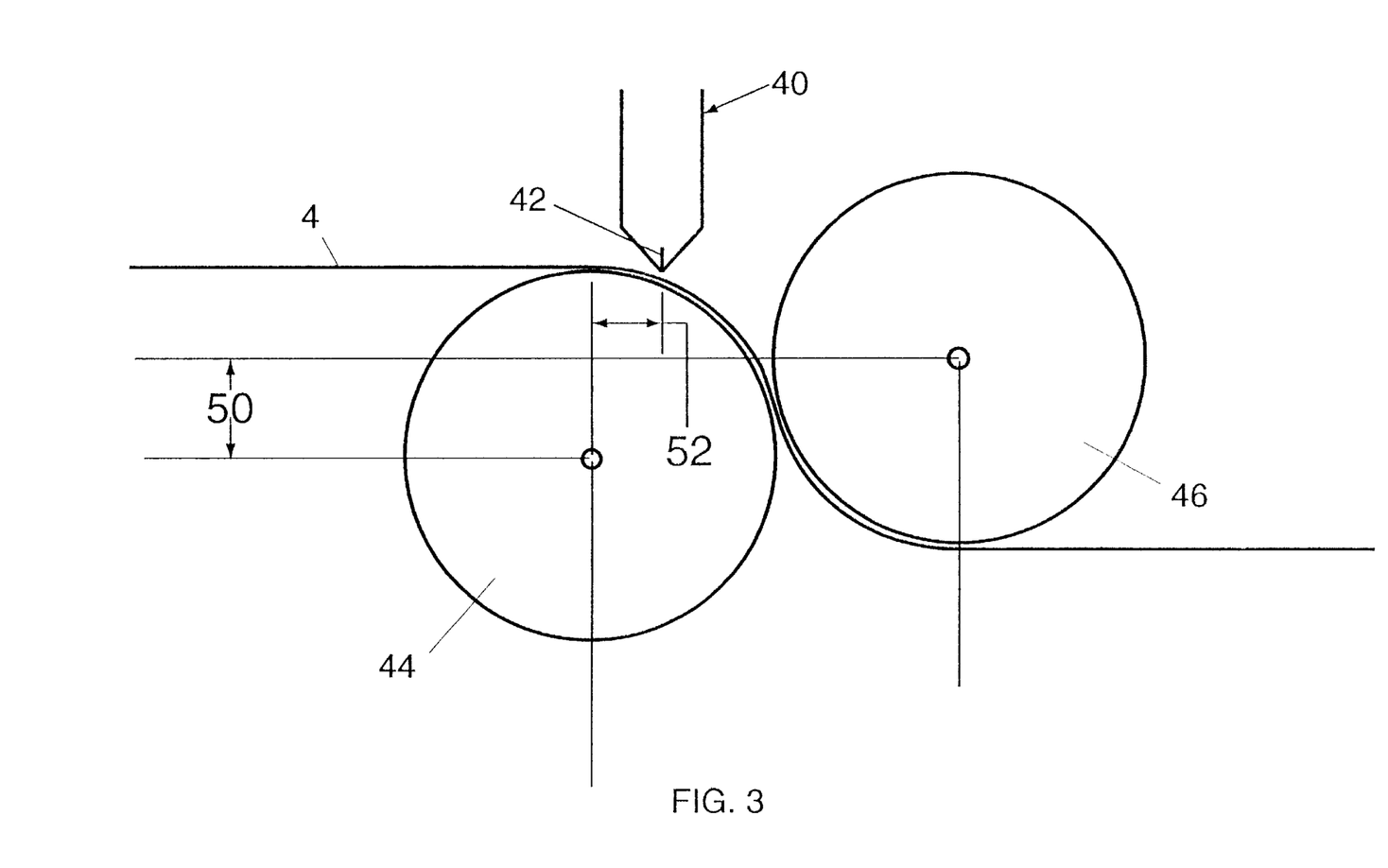
FIG. 3 shows the relationship of the extruder head to the support and pressure rollers.

The slot die 40 is preferably positioned just over the nip of two polymer-coated steel rolls. (The moving strip travels in the direction of the arrow shown in FIG. 2.). The two rollers are a support roller 44 and a pressure roller 46. Horizontal or vertical extruders can be used with, or without the feeding block arrangement. The polymer coated steel rolls are made of a high-temperature-resistant silicon-type polymer of between 35 and 50 durometer hardness. FIG. 3 shows the positioning of the slot die 40 relative to the aluminum strip 4 and the two rollers 44, 46. The two rollers comprise a support roller 44 and a compression roller 46, also known as a nip pressure roller. The vertical offset 50 between the centers of both rolls 44, 46 is designed to reduce the air gap and reduce the air entrapment. Preferably, the centers of each roll are substantially vertically offset by about 1 inch to about 1½ inches, more preferably the distance is between 1⅛ to 1¼ inches. The slot die 40 in the extruder head 28 is positioned between ⅛ to 1 inches above the aluminum strip 4, more preferably approximately ⅜ of an inch. The slot die 10 is positioned approximately between 1⅝ and 2¼ inches, more preferably approximately 2 inches from the center of the support roll 44 towards the compression roll 46 (see 52). It can be understood by one of ordinary skill in the art that the gap between the slot die 40 and the support roll 44, the speed of the aluminum strip 4, and the resin amount are proportioned so that the resin does not overcoat the aluminum strip 4. A modification in one of the elements above may necessitate a modification in another of the above elements. Such modifications are within the skill of the art. The compression roller 46 is used to draw the thin resin and to remove air.

The nip pressure roll 46 is designed so that it does not pick up any resin. These rolls are preferably covered with a silicone type polymer which provides release of the extruded films. This is an inherent property of silicone, it is incompatible with other resins, it only adheres to itself. The support roll 46 and the nip pressure roll 44 are also designed to be opened and closed. For example, the two rollers can be pulled apart for positioning of the strip 4 or other operations. Preferably, the distance between the centers of the rolls is 6⅜ inches when opened, and 5⅞ inches when closed. These rolls have given favorable performance in that: they provide a good pressure nip for the bonding of the resin to the moving aluminum strip; the extrudates do not adhere to the pressure roll surface, even at high pressure there is no evidence of the extruded film picking onto the roll surface; they eliminate air entrapment between the extrudate and the aluminum strip; they provide good drawing and polishing of the extruded film; and they exhibit excellent process temperature resistance.

The nip and support roller for the first extrusion coating head 8 of FIG. 1 are positioned to coat one surface of the aluminum strip, e.g. the underside of the aluminum strip. The nip and support roller 14 of the second extrusion coating head 12 are positioned to coat the other surface of the aluminum strip, e.g. the top of the aluminum strip in the same manner as the first extrusion coating head 8 applied film to the bottom of the strip. This operation is sequential, in that the first extrusion coating head 8 applies resin 'upstream' of the second extrusion coating head 12.

The resin from the extrusion coater is applied to the aluminum strip in a certain thickness. For example, it is preferred that the resin is extruded at no more than 0.018 inches thick, but not less than 0.005 inches thick, more preferably no more than 0.016 inches thick, but less than 0.01 inches thick. Typically, the extrusion coating is drawn to a reduced thickness of approximately no more than 0.0004 inches thick, and no less than 0.00004 inches thick. More preferably, not more than 0.0003 inches thick, and not less than 0.00003 inches thick. The extrusion coating may be drawn by the pressure of the compression roller, for example. Other methods of drawing are through the modification of the aluminum strip speed and the nip roll pressure.

After the aluminum strip 4 is moved from the second extrusion coating head 12 and its two rollers 14, it is fed to the final cure, such as an infrared or induction heater 16, to dry or cure the resin. Typical heaters of this type include: air-gas convection; infrared; plasma; and corona discharge heaters. This heater 16 also can be called a curing oven. The temperature to which the aluminum strip 4 is heated is preferably no more than 460° F., but no less than 430° F. More preferably the aluminum strip is heated to no more than 450° F., but no less than 440° F. Further, the desired postheating temperature is preferably in the range of approximately 392–500° F.

The moving aluminum strip 4 is passed to a quench 20, preferably an air quench, also called an air flotation cooler. Air quenching is designed to cool the moving aluminum strip 4 with the applied resin so that it can be lubricated and recoiled. Air quench devices are commonly known in the art. Other quenching/cooling devices include: cooling drum rolls; water quench; and/or a combination of air-water quenching.

Preferably, the moving aluminum strip 4 is cooled to no more than 150° F., more preferably to no more than 130° F. to achieve cooling to these temperatures, the air quench is adapted to provide air flows of approximately 1200 feet per minute. Further, the moving aluminum strip 4 may be cooled to temperatures below approximately 104° F.

After passage through the air quench, the aluminum strip 4 is positioned using a roller 22 into a two roll (per side) coat lubricator 24. These lubricators 24 are known in the art and are commercially available. Representative examples of this type of device are: air spray; and electrostatic lubricators.

This lubricator 24 will apply a lubricant, such as a microcrystalline wax or light oil. This lubrication serves a purpose of lubricating the aluminum strip 4 for further can making operations such as cupping and body making (in the case of can body stock), or formation into the lid or tab for lid and tab stock.

The aluminum strip that is coated by this invention may be a variety of alloys and tempers, depending on the use of the strip. The strip is preferably greater than 4 or 6 inches wide, more preferably, more than 10 or 12 inches wide. Preferably, the width of the strip is not more than 36 or 24 inches wide, more preferably no more than 20 or 18 inches wide.

Typical aluminum alloys are used as can body stock, lid and tab stock. In general, alloys suitable for use in the practice of the present invention are those aluminum alloys containing from about 0 to about 0.6% by weight silicon, from 0 to about 0.8% by weight iron, from about 0 to about 0.6% by weight copper, from about 0.2 to about 1.5% by weight manganese, from about 0.2 to about 5% by weight magnesium, from about 0 to about 0.25% by weight zinc, with the balance being aluminum with its usual impurities. Representative of suitable alloys include aluminum alloys from the 1000, 2000, 3000, 4000, 5000, 6000, 7000, and 8000 series. Some examples are the 3000 and 5000 series, such as AA 3004, AA 3104, AA 5017, and 5182.

Typical tempers are the H-19 or H-39 tempers and the metal strip is typically 0.1778–0.356 mm (0.007 to 0.014 inches) thick.

Other devices used for coating surfaces of aluminum strip are shown in the following U.S. Pat. Nos. 5,407,702; 5,582,319; and 5,197,536 as well as PCT Publication WO 94/01224, the disclosures of which are all hereby incorporated by reference in their entireties.

In accordance with this invention, a variety of thermoplastic or thermosettable polyester resins can be used to coat an aluminum strip which is designed for use in packaging, such as can bodies, can lids or tabs. PCT publication WO 94/01224 provides a description of many resins that are used to coat aluminum can stock. The disclosure of this PCT application is hereby incorporated by reference in its entirety. Thermoplastic resins suitable for use in this invention include polypropylene, polyethylene, polyamides (nylon), polycarbonates, and polyvinyl chloride (PVC) and epoxies. A highly preferred resin is Dow Primacor® 3460 polymer, which is an ethylene-acrylic acid copolymer.

The composition may, for example, comprise one of the following systems, or a blend of two or more such systems may be used:

1) Epoxy resin, or epoxy novolac resin, preferably, but not limited to, bisphenol Apichlorodydrin-based materials exemplified by solid materials such as, for instance, Shell Epikote 1009, 1007, 1004, 1002, 1001 and 828, in combination with one or more resole phenolic resins which may be alkylated or non-alkylated as exemplified by Uravar FB190, Uravar FB120, Varcum 29-101, Varcum 29-108, Varcum 29-159, Varcum 29-183 and Varcum 94-635.

The epoxy resin may be modified with one or more polyesters, which may be (a) branched or linear, acid- and/or hydroxy-functional, as exemplified by Dynapol LH820 (a saturated, medium molecular weight, linear, hydroxy-functional polyester); Dynapol L858 (a saturated, high molecular weight, branched polyester); Dynapol L206, (a saturated, high molecular weight, linear polyester); and Uralac 2695 (a saturated, medium molecular weight, branched carboxylated polyester); or (b) one or more diacids, exemplified by succinic, adipic, sebacic, isophthalic, terephthalic and phthalic acids or (c) one or more diols exemplified by ethylene, propylene, diethylene and triethylene glycols, 1,4-butanediol, 1,6-hexanediol, and cyclohexanedimethanol.

The system may be further crosslinked with one or more essentially solvent-free aminoplast resins, exemplified by Cymel 301 (hexamethoxymethyl melamine), Cymel 1123 (Benzoguanamine formaldehyde), Cymel 1170 (Glycol uril formaldehyde) and UFR-80 (Urea formaldehyde), all from Dyno Cynamid, and/or bisphenol A epichlorohydrin-based epoxy resins, exemplified by liquid materials such as, for instance, Shell Epikote 828, Dow DER330, Ciba Araldite GY2600 and 260, and/or epoxy novolac resins exemplified by Dow DEN 431 or DEN 438.

2) Polyester resin, as exemplified by those described in 1)a) above, in combination with one or more resole phenolic resins as exemplified by those described in 1) above, and/or essentially solvent-free aminoplast resins, as exemplified by those described in 1) above. The system may be further crosslinked with additions of epoxy (e.g. liquid epoxy) and/or epoxy novolac resins as exemplified by those described in 1) above.

3) Epoxy resin, as exemplified by materials such as those described in 1) above, in combination with one or more organic anhydrides or anhydride oligomers as exemplified by one or more of trimellitic, succinic, phthalic, hexahydrophthalic and tetrahydrophthalic anhydrides.

4) Epoxy resin, as exemplified by materials such as those described in 1) above, in combination with high solids, typically at least 60 percent, acid-functional acrylic polymers, acid value typically greater than 50 mg KOH/g as exemplified by Reichold Synthemal 40-462, McWhorter Acrylamac 7555, HiTek CMD 979, HiTek RGX-87425, Paraloid AT-70, or Paraloid AT-85.

5) Hydroxy-functional polyester, as exemplified by those described in 1) above, in combination with isocyanate which may be internally or externally blocked as exemplified by uret diones, phenol blocked isocyanates, such as for instance, Desmodur AP stable (Byer), and/or essentially solvent-free aminoplast resin as described in 1) above.

6) (a) Emulsion polymers based on crosslinkable thermosetting acrylic resins, as exemplified by Union Carbide Ucar 4510 and Rohm & Haas Primal AC 1822, crosslinked with additional components such as essentially solvent-free aminoplast resins, liquid or solid epoxy resins or epoxy-novolac resins, all as described in 1) above.

(b) Emulsion polymers based on self-crosslinking thermosetting acrylic resins, as exemplified by Rhoplex AC-604, AC-625, AC 1230 and HA-16.

7) A linear or branched polyester with acid functionality sufficient for reaction with the chosen crosslinking agent, which may be an epoxy resin, more especially an epoxy resin as described in 1) above. Typically, the polyester will have an acid value of at least 30 mg KOH/g as exemplified by EMS Grilesta V72/6 and Uralac P2695.

The system may be crosslinked with dicyandiamide, epoxy-novolac, phenolic and/or aminoplast resins as described in 1) and 2) above.

The present device and process will now be illustrated by reference to the following examples which set forth particularly advantageous embodiments. However, it should be noted that these embodiments are illustrative and are not to be construed as restricting the invention in any way.

EXAMPLE I

I coated both surfaces of a moving aluminum strip, having the following dimensions 0.0088 gauge by 6 inch width and 1800 linear feet, using the above described extrusion device. The extrudable resin was Vermicolor (manufactured by Dexter Coatings, resin ID no. 96-605-15). The process conditions were:

Extruder Parameters

| | |
|---|---|
| Barrel Temperature | 410° F., 420° F., and 430° F. |
| Transfer Bar | 425° F. |
| Feed Block | 400° F. |
| Die | 400° F. |
| Melt Temperature | 370° F. |
| Feeding Rate | 50 RPM exterior surface |
| | 60 RPM interior surface |
| Pressure | 1400–2000 |
| Line Process Speed | 125 f.p.m. for exterior surface and |
| | 75 f.p.m. for interior surface |
| Preheat Temperature | 350° F. |
| Cure Temperature | 430° F. |

Substrate 0.0088"×6"×5182×1800 linear feet chemically and conversion coated with zirconium pretreatment.

Applied Film Thickness

Interior surface 8 microns; exterior surface 4 microns

Film Appearance

Acceptable clarity and gloss development upon thermal cure of 430° F.

Film Adhesion

Excellent, with no tape removal or feathering after a 15 minute boiling water immersion test. No apparent blush on the coated film after this water-immersion test.

Retortability (90 minutes at 250° F.)

No apparent blush of the film in either the water or steam phase and no loss of adhesion.

Beverage End Fabrication

Beverage, soft drink 202 ends were converted in a commercial end production plant. The ends from the extrusion coated test coil are comparable to the commercial ends being produced at the same time. The cut edge is clear with no hairing, the extruded film exhibits no flaking or fracturing in the countersink or rivet area of the converted ends.

Metal exposure on these fully converted ends was determined by means of Enamel Rater test expressed in mil-amp.

| Random Test End | Actual Readings Mil-Amp. |
| --- | --- |
| 1 | 0.1 |
| 2 | 0.1 |
| 3 | 0 |
| 4 | 0.1 |
| 5 | 0 |
| 6 | 0 |
| 7 | 0 |
| 8 | 0 |
| 9 | 0 |
| 10 | 0 |

EXAMPLE II

To distinguish the present invention from previous processes I tested a resin that is disclosed as a preferred high viscosity polyester resin in U. S. Pat. No. 5,407,702 and named DuPont Selar® resin PT-8307. I attempted to extrude this resin at a barrel temperature of 450–515° F. a transfer bar temperature of 530–535° F., a feed block temperature of 535° F., an extruding die temperature of 535° F., and a melt temperature of 480–500° F. These temperatures were in the recommended range for this resin and they differ substantially from the temperatures recommended for the present process and device as shown above. However, even at these elevated temperatures, I was unable to extrude this resin in the present device due to the high melt viscosity of the resin.

The present invention has been described with referenced to specific embodiments. However, this application is intended to cover those changes and substitutions which may be made by those skilled in the art without departing from the spirit and scope of the appended claims.

I claim:

1. A process for coating a metal strip with a polymer, comprising the steps of:
   heating a metal strip having a thickness between approximately 0.015 and 0.006 inch to a temperature between about 250–500° F.;
   positioning a surface of the metal strip with a pair of rolls below an extrusion coating head configured to extrude a thin molten polymeric film, the outlet of the extrusion coating bend positioned ahead of the roll nip between the pair of rolls;
   extruding the thin molten polymeric film onto the surface of the metal strip with the extrusion coating head ahead of the roll nip;
   subsequently drawing the thin molten polymeric film to a thickness of less than about 0.0001 to about 0.00003 inch on the surface of the metal strip in the roll nip;
   postheating the coated metal strip to a temperature between about 392–500° F.; and
   quenching the coated metal strip to a temperature between about 104–150° F.

2. The method of claim 1, further including the step of pretreating the surface of the metal strip with a conversion coating selected from the group consisting of chromium, zirconium, and titanium before the thin polymeric film is extruded onto the surface of the metal strip.

3. The method of claim 1, wherein the step of quenching the metal strip is performed by air quenching the metal strip.

4. The method of claim 1, wherein the thin polymeric film is a thermoplastic resin selected from the group consisting of polyester, epoxy, high molecular weight epoxy, polypropylene, polyethylene, polyamides, polycarbonates, and polyvinyl chloride.

5. The method of claim 1, wherein the metal strip has a thickness between approximately 0.012 and 0.008 inch.

6. The method of claim 1, wherein the thin polymeric film extruded onto the surface of the metal strip is a thermosetting resin.

7. The method of claim 1, further including the step of precleaning the surface of the metal strip with caustic or acid washes before the thin polymeric film is extruded onto the surface of the metal strip.

8. A process for coating an aluminum metal strip with a polymer, comprising the steps of:
   heating an aluminum strip having a thickness between approximately 0.015 and 0.006 inch to a temperature between about 250–500° F.;
   positioning a surface of the aluminum strip with a pair of rolls below an extrusion coating head configured to extrude a thin molten polymeric film, the outlet of the extrusion coating head positioned ahead of the roll nip between the pair of rolls;
   extruding the thin molten polymeric film onto the surface of the aluminum strip with the extrusion coating head ahead of the roll nip;
   subsequently drawing the thin molten polymeric film to a thickness of less than about 0.0001 to about 0.00003 inch on the surface of the aluminum strip in the roll nip;
   postheating the coated aluminum strip to a temperature between about 392–500° F.; and
   quenching the coated aluminum strip to a temperature between about 104–150° F.

9. The method of claim 8, further including the step of pretreating the surface of the aluminum strip with a conversion coating selected from the group consisting of chromium, zirconium, and titanium before the thin polymeric film is extruded onto the surface of the aluminum strip.

10. The method of claim 8, wherein the step of heating the aluminum strip is performed in a preheat oven, and the method further includes the step of positioning the aluminum strip with entry rollers prior to passing the aluminum strip into the preheat oven.

11. The method of claim 8, wherein the step of quenching the aluminum strip is performed by air quenching the aluminum strip.

12. The method of claim 8, further including the steps of lubricating the surface of the aluminum strip having the thin polymeric film and coiling the coated aluminum strip on a coiler.

13. The method of claim 8, wherein the aluminum strip is an aluminum alloy strip.

14. The method of claim 8, wherein the thin polymeric film is a thermoplastic resin selected from the group consisting of polyester, epoxy, high molecular weight epoxy, polypropylene, polyethylene, polyamides, polycarbonates, and polyvinyl chloride.

15. The method of claim 8, wherein the aluminum strip has a thickness between approximately 0.012 and 0.008 inch.

16. The method of claim 8, wherein the aluminum strip is heated to a temperature between about 350–400° F., postheated to a temperature between about 430–460° F., and quenched to a temperature between about 130–150° F.

17. The method of claim 8, wherein the thin polymeric film extruded onto the surface of the aluminum strip is a thermosetting resin.

18. The method of claim 8, further including the step of precleaning the surface of the aluminum strip with caustic or acid washes before the thin polymeric film is extruded onto the surface of the aluminum strip.

19. A process for coating both surfaces of an aluminum metal strip with a polymer, comprising the steps of:
heating an aluminum strip having a thickness between approximately 0.015 and 0.006 inch to a temperature between about 250–500° F.;
positioning a first surface of the aluminum strip with a first pair of rolls below a first extrusion coating head configured to extrude a thin molten polymeric film, the outlet of the first extrusion coating head positioned ahead of the roll nip between the first pair of rolls;
extruding the thin molten polymeric film onto the first surface of the aluminum strip with the first extrusion coating head ahead of the roll nip between the first pair of rolls;
subsequently drawing the thin molten polymeric film to a thickness of less than about 0.0001 to about 0.00003 inch on the first surface of the aluminum strip in the roll nip between the first pair of rolls;
positioning the second surface of the aluminum strip with a second pair of rolls below a second extrusion coating head configured to extrude a thin molten polymeric film, the outlet of the second extrusion coating head positioned ahead of the roll nip between the second pair of rolls;
subsequently drawing the thin molten polymeric film to a thickness of less than about 0.0001 to about 0.00003 inch on the second surface of the aluminum strip in the roll nip between the second pair of rolls;
postheating the coated aluminum strip to a temperature between about 392–500° F.; and
quenching the coated aluminum strip to a temperature between about 104–150° F.

20. The method of claim 19, further including the step of pretreating the surfaces of the aluminum strip with a conversion coating selected from the group consisting of chromium, zirconium, and titanium before the thin polymeric films are extruded onto the surfaces of the aluminum strip.

21. The method of claim 19, wherein the step of heating the aluminum strip is performed in a preheat oven, and the method further includes the step of positioning the aluminum strip with entry rollers prior to passing the aluminum strip into the preheat oven.

22. The method of claim 19, wherein the step of quenching the aluminum strip is performed by air quenching the aluminum strip.

23. The method of claim 19, further including the steps of lubricating the coated surfaces of the aluminum strip and coiling the coated aluminum strip on a coiler.

24. The method of claim 19, wherein the aluminum strip is an aluminum alloy strip.

25. The method of claim 19, wherein the thin polymeric film extruded onto each of the surfaces of the aluminum strip is a thermoplastic resin selected from the group consisting of polyester, epoxy, high molecular weight epoxy, polypropylene, polyethylene, polyamides, polycarbonates, and polyvinyl chloride.

26. The method of claim 19, wherein the aluminum strip has a thickness between approximately 0.012 and 0.008 inch.

27. The method of claim 19, wherein the aluminum strip is heated to a temperature between about 350–400° F., postheated to a temperature between about 430–460° F., and quenched to a temperature between about 130–150° F.

28. The method of claim 19, wherein the thin polymeric film extruded onto each of the surfaces of the aluminum strip is a thermosetting resin.

29. The method of claim 19, further including the step of precleaning the surfaces of the aluminum strip with caustic or acid washes before the thin polymeric films are extruded onto the surfaces of the aluminum strip.

30. A process for coating both surfaces of a metal strip with a polymer, comprising the steps of:
heating a metal strip having a thickness between approximately 0.015 and 0.006 inch to a temperature between about 250–500° F.;
positioning a first surface of the metal strip with a first pair of rolls below a first extrusion coating head configured to extrude a thin molten polymeric film, the outlet of the first extrusion coating head positioned ahead of the roll nip between the first pair of rolls;
extruding the thin molten polymeric film onto the first surface of the metal strip with the first extrusion coating head ahead of the roll nip between the first pair of rolls;
subsequently drawing the thin molten polymeric film to a thickness of less than about 0,0001 to about 0.00003 inch on the first surface of the metal strip in the roll nip between the first pair of rolls;
positioning the second surface of the metal strip with a second pair of rolls below a second extrusion coating head configured to extrude a thin molten polymeric film, the outlet of the second extrusion coating head positioned ahead of the roll nip between the second pair of rolls;
subsequently drawing the thin molten polymeric film to a thickness of less than about 0.0001 to about 0.00003 inch on the second surface of the metal strip in the roll nip between the second pair of rolls;
postheating the coated metal strip to a temperature between about 392–500° F.; and
quenching the coated metal strip to a temperature between about 104–150° F.

31. The method of claim 30, further including the step of pretreating the surfaces of the metal strip with a conversion coating selected from the group consisting of chromium, zirconium, and titanium before the thin polymeric films are extruded onto the surfaces of the metal strip.

32. The method of claim 30, wherein the step of quenching the metal strip is performed by air quenching the metal strip.

33. The method of claim 30, wherein the thin polymeric film extruded onto each of the surfaces of the metal strip is a thermoplastic resin selected from the group consisting of polyester, epoxy, high molecular weight epoxy, polypropylene, polyethylene, polyamides, polycarbonates, and polyvinyl chloride.

34. The method of claim 30, wherein the metal strip has a thickness between approximately 0.012 and 0.008 inch.

35. The method of claim 30, wherein the thin polymeric film extruded onto each of the surfaces of the metal strip is a thermosetting resin.

36. The method of claim 30, further including the step of precleaning the surfaces of the metal strip with caustic or acid washes before the thin polymeric films are extruded onto the surfaces of the metal strip.

* * * * *